P. Hamilton,
Saw Mill,
No. 51,310. Patented Dec. 5, 1865.
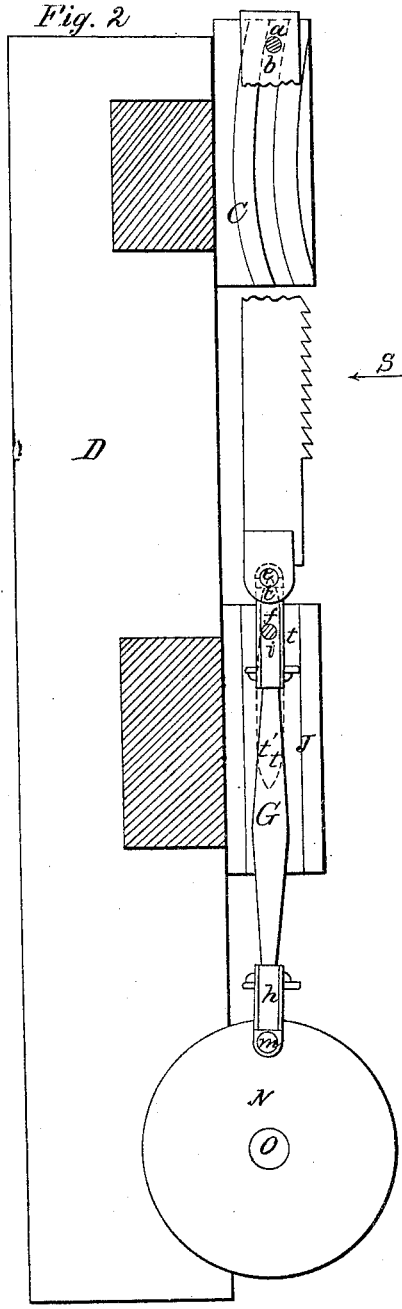
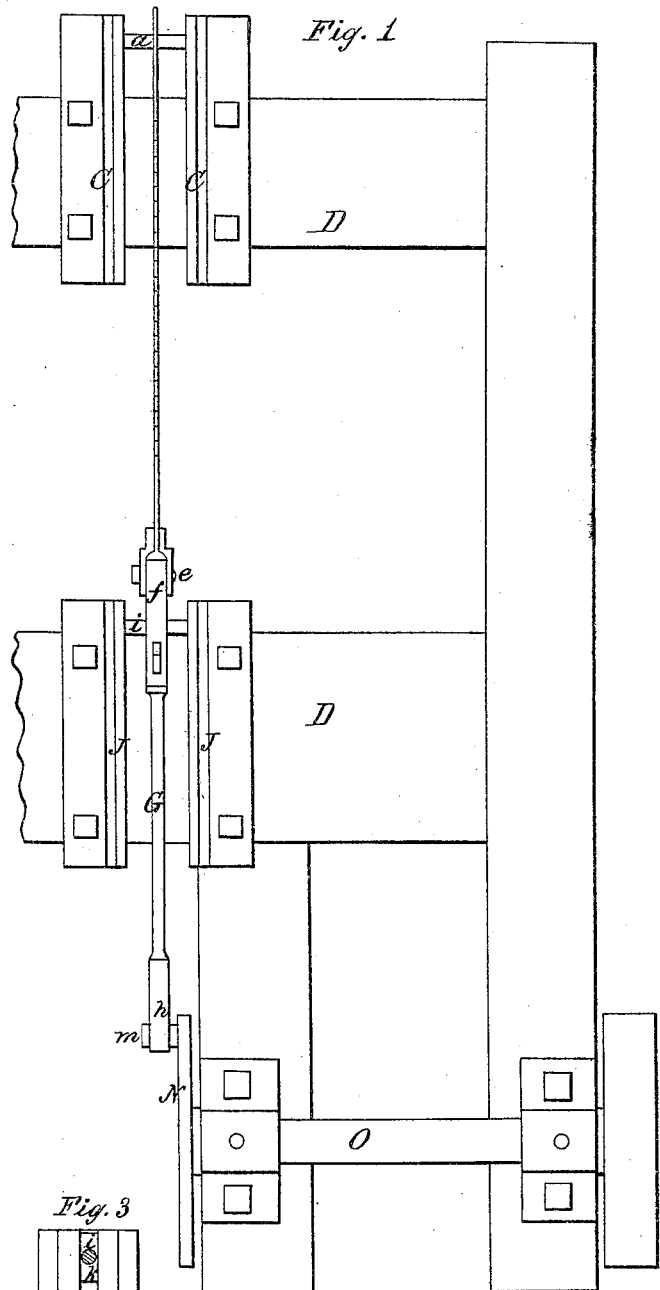
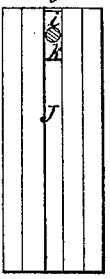
Witnesses
Chas. R. Walker
W. L. Bennem
Inventor
Palmer Hamilton
by his Attorney
E. S. Renwick

UNITED STATES PATENT OFFICE.

PALMER HAMILTON, OF DETROIT, MICHIGAN.

IMPROVEMENT IN SAW-MILLS.

Specification forming part of Letters Patent No. 51,310, dated December 5, 1865.

*To all whom it may concern:*

Be it known that I, PALMER HAMILTON, of Detroit, in the county of Wayne and State of Michigan, have invented certain new and useful Improvements in Hanging and Running Saws in Saw-Mills; and I do hereby declare that the following is a full, clear, and exact description of the same, reference being had to the accompanying drawings, in which—

Figure 1 represents a front elevation of a portion of a saw-mill with my improvements applied thereto. Fig. 2 represents a vertical section of the same with a portion of the saw removed, and Fig. 3 represents a side view of one of the lower guides of the saw.

The object of my invention is to impart to the saw of a saw-mill a rocking motion while it is cutting, so that the movement of its toothed edge then assimilates to that of the pit-saw operated by hand.

To this end my invention consists of the combination of the saw with a pair of curved guides at the upper end of the saw and a lever connecting-rod or pitman, straight guides, pivoted cross-head and slides or blocks, and crank-pin or their equivalents at the opposite end, whereby the toothed edge of the saw is caused to move unequally forward and backward at its two ends while cutting.

The best mode of embodying my invention in a practical form with which I am acquainted is represented in the accompanying drawings, in which the saw is fitted at its upper extremity with a cross-head, $a$, whose ends are pivoted in blocks $b$, which are arranged to slide in the grooves of a pair of curved guides, C C, that are secured to the frame D of the saw-mill.

The lower end of the saw is connected by a pivot, $e$, with the overhanging end $f$ of a lever-connecting rod, G, which is fitted at a point intermediate between its two ends $f\ h$ with a cross-head, $i$. The ends of this cross-head are pivoted in a pair of blocks, $k$, which are arranged to slide in the grooves of a pair of guides, J J, that are secured to the frame of the saw-mill. The lower end, $h$, of the connecting-rod G is connected with a crank-pin, $m$, which projects from the face of a wheel, N, secured to a rotating shaft, O, by turning which the saw is caused to move to and fro.

The feed-motion of the saw-mill must, of course, be arranged to cause the log to be moved in the direction of the arrow $s$ toward the cutting-edge of the saw. As the upper guides are concave to the advance of the log, the effect upon the upper end of saw is, that while it is descending it also moves in the direction indicated by the arrow $s$, and it continues this movement as it descends until about half of the stroke is accomplished. Then, during the remainder of the stroke it moves in a direction the reverse of that indicated by the arrow $s$. Moreover, as the connecting-rod is made to oscillate upon the axis of its cross-head $i$ by the rotary motion of the crank, the end $f$, which overhangs the cross-head and is connected with the saw, and that end of the saw are caused to describe a curved line, $t$, which is convex to the advance of the log, so that the lower end of the saw has a curved movement the reverse of that of its upper end. The result is that the toothed edge of the saw rocks upon its work with a movement similar to that of the ordinary pit-saw worked by hand, and the cutting is materially facilitated. On the other hand, when the saw rises, its lower end is caused, by the oscillation of the connecting-rod, to describe a curve (represented by the dotted line $t'$) which is concave to the advance of the log, so that the toothed edge is moved away from the wood or freed therefrom, thereby permitting the log to be fed forward during the whole ascent of the saw, and also permitting the sawdust to escape after each cut, however deep the cut may have been, whereby choking is effectually prevented.

Having thus described the best mode with which I am acquainted of embodying my improvements, what I claim as my invention, and desire to secure by Letters Patent, is—

Giving to the saw in its downward movement a rocking or rolling motion by means of the combination of the cross-head working in curved guides at the upper end of the saw, the lower end of which is attached to a cross-head working in straight guides and pivoted to the pitman below the saw, with the crank-pin, substantially as described.

In witness whereof I have hereunto set my hand this 4th day of August, 1864.

PALMER HAMILTON.

Witnesses:
WM. JENNISON, Jr.,
C. CROUSE.